United States Patent
Cheon

(10) Patent No.: US 10,196,026 B2
(45) Date of Patent: Feb. 5, 2019

(54) METHOD AND SYSTEM FOR RECOGNIZING A TILT ANGLE THROUGH SENSING OF TORQUE VARIATION IN VEHICLE

(71) Applicant: MANDO CORPORATION, Pyeongtaek-si, Gyeonggi-do (KR)

(72) Inventor: Seung Woo Cheon, Seongnam-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 7 days.

(21) Appl. No.: 15/585,553

(22) Filed: May 3, 2017

(65) Prior Publication Data

US 2017/0320412 A1 Nov. 9, 2017

(30) Foreign Application Priority Data

May 4, 2016 (KR) .................. 10-2016-0055395

(51) Int. Cl.
*B60R 21/015* (2006.01)
*B62D 1/187* (2006.01)
*B62D 6/10* (2006.01)
*B60N 2/90* (2018.01)

(52) U.S. Cl.
CPC ........ *B60R 21/01552* (2014.10); *B60N 2/919* (2018.02); *B60R 21/01554* (2014.10); *B62D 1/187* (2013.01); *B62D 6/10* (2013.01)

(58) Field of Classification Search
CPC .. B60N 2/442; B60N 2/919; B60R 21/01552; B60R 21/01554; B62D 1/187; B62D 6/10
See application file for complete search history.

(56) References Cited

U.S. PATENT DOCUMENTS

| | | | | |
|---|---|---|---|---|
| 2012/0277954 | A1* | 11/2012 | Kimura | B62D 1/10 701/41 |
| 2014/0360310 | A1* | 12/2014 | Osonoi | B62D 1/16 74/496 |
| 2016/0236703 | A1* | 8/2016 | Kuwabara | B62D 1/187 |

FOREIGN PATENT DOCUMENTS

KR 10-1998-0049030 9/1998

\* cited by examiner

*Primary Examiner* — Richard M Camby
(74) *Attorney, Agent, or Firm* — Hauptman Ham, LLP

(57) ABSTRACT

Disclosed herein is a system for recognizing a tilt angle through detection of torque variation in a vehicle. The system includes a steering unit including a steering wheel steered by a driver and a steering shaft connected to the steering wheel, a torque detection unit configured to detect a torque variation according to a change in tilt angle of the steering shaft, and a control unit configured to calculate a torque variation using pre-stored data for a joint angle of the steering shaft and a plane angle of the steering shaft according to the change in tilt angle of the steering shaft, and to derive data for a tilt angle of the steering shaft by matching the calculated torque variation with the torque variation detected by the torque detection unit.

14 Claims, 6 Drawing Sheets

[Fig. 1]
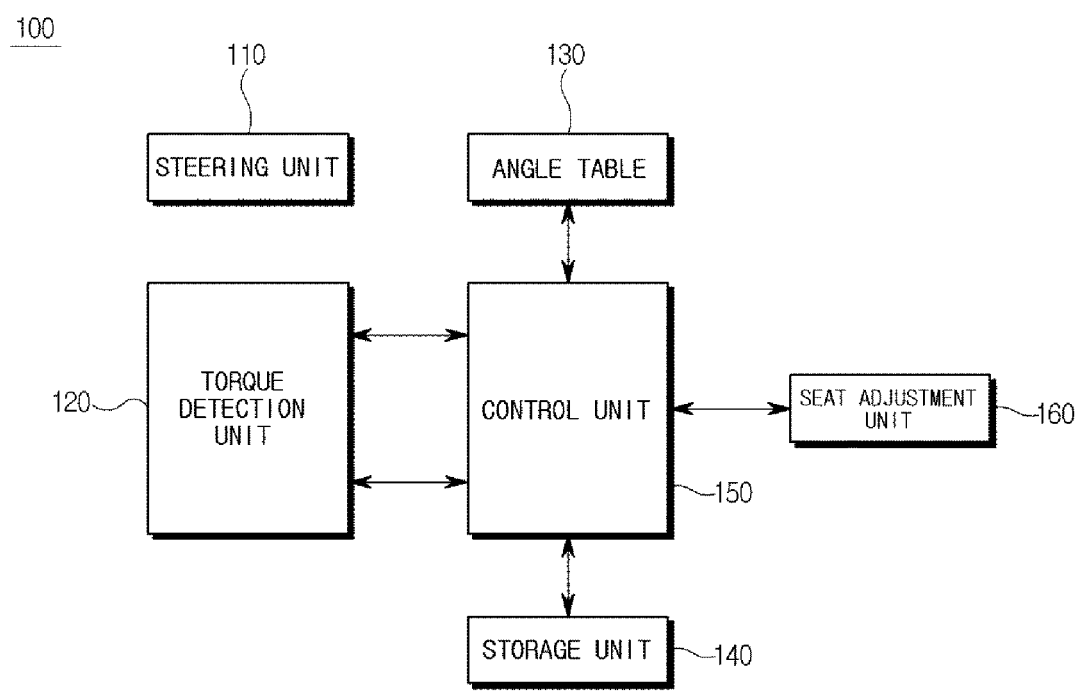

[Fig. 2]
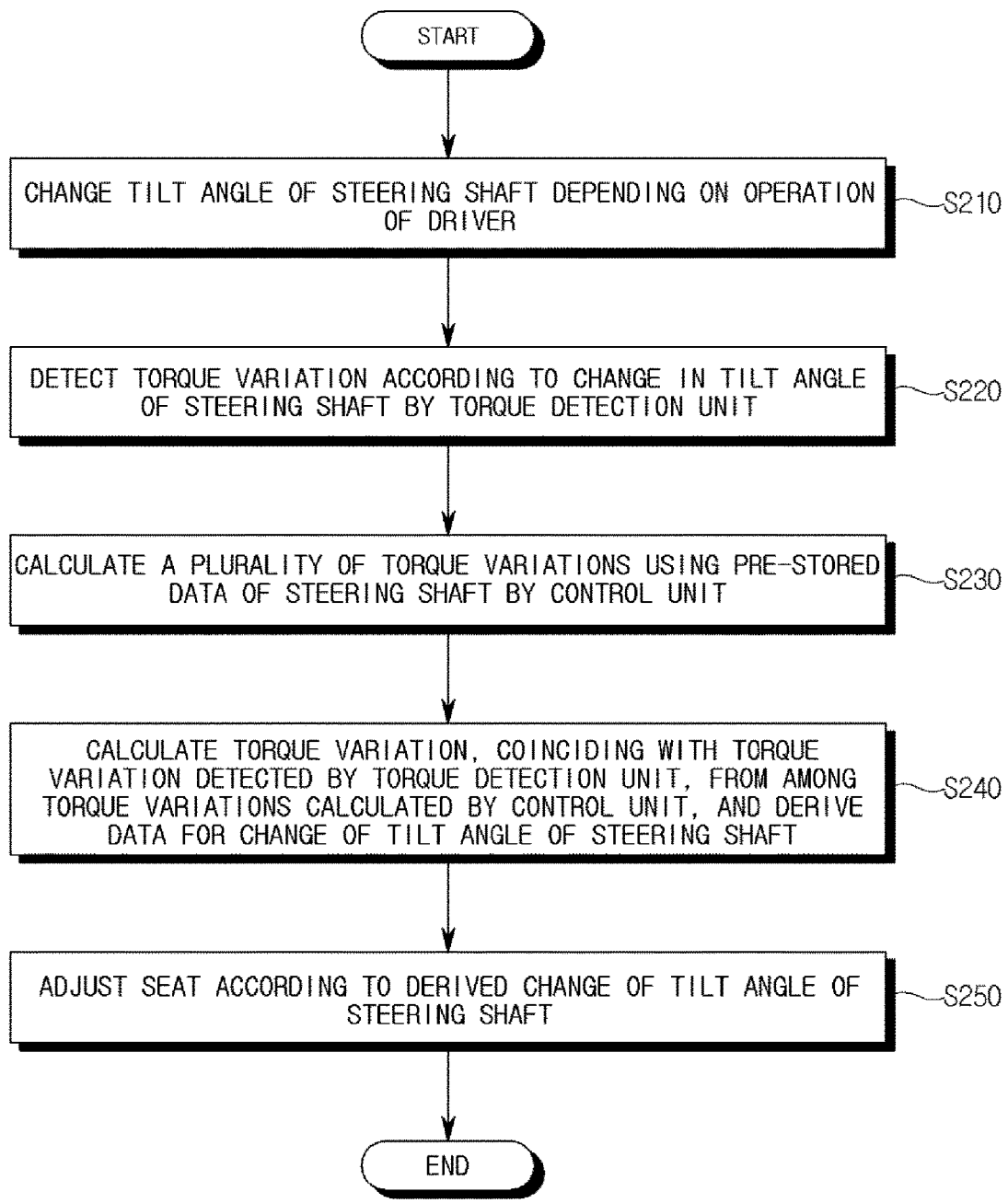

[Fig. 3]
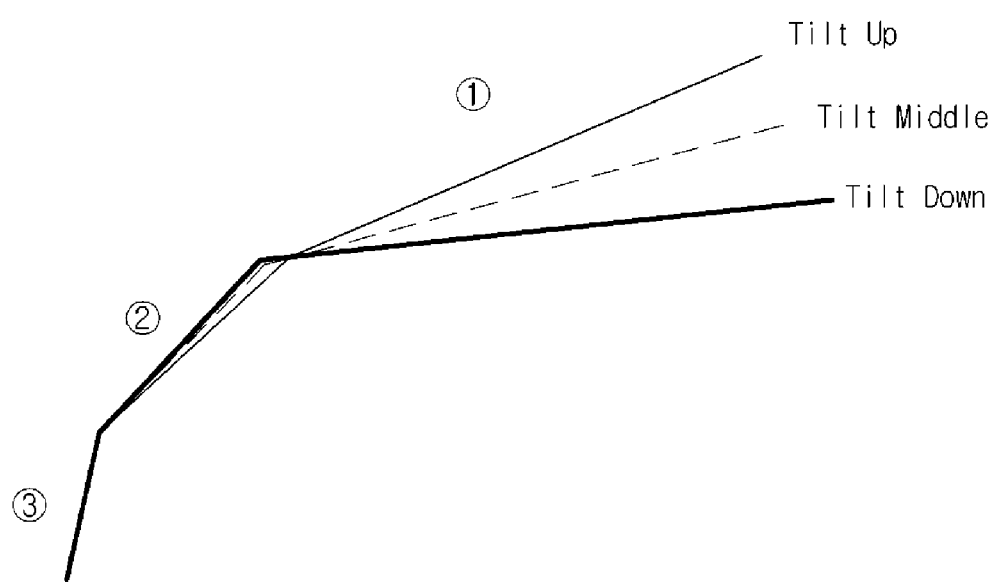

[Fig. 4]
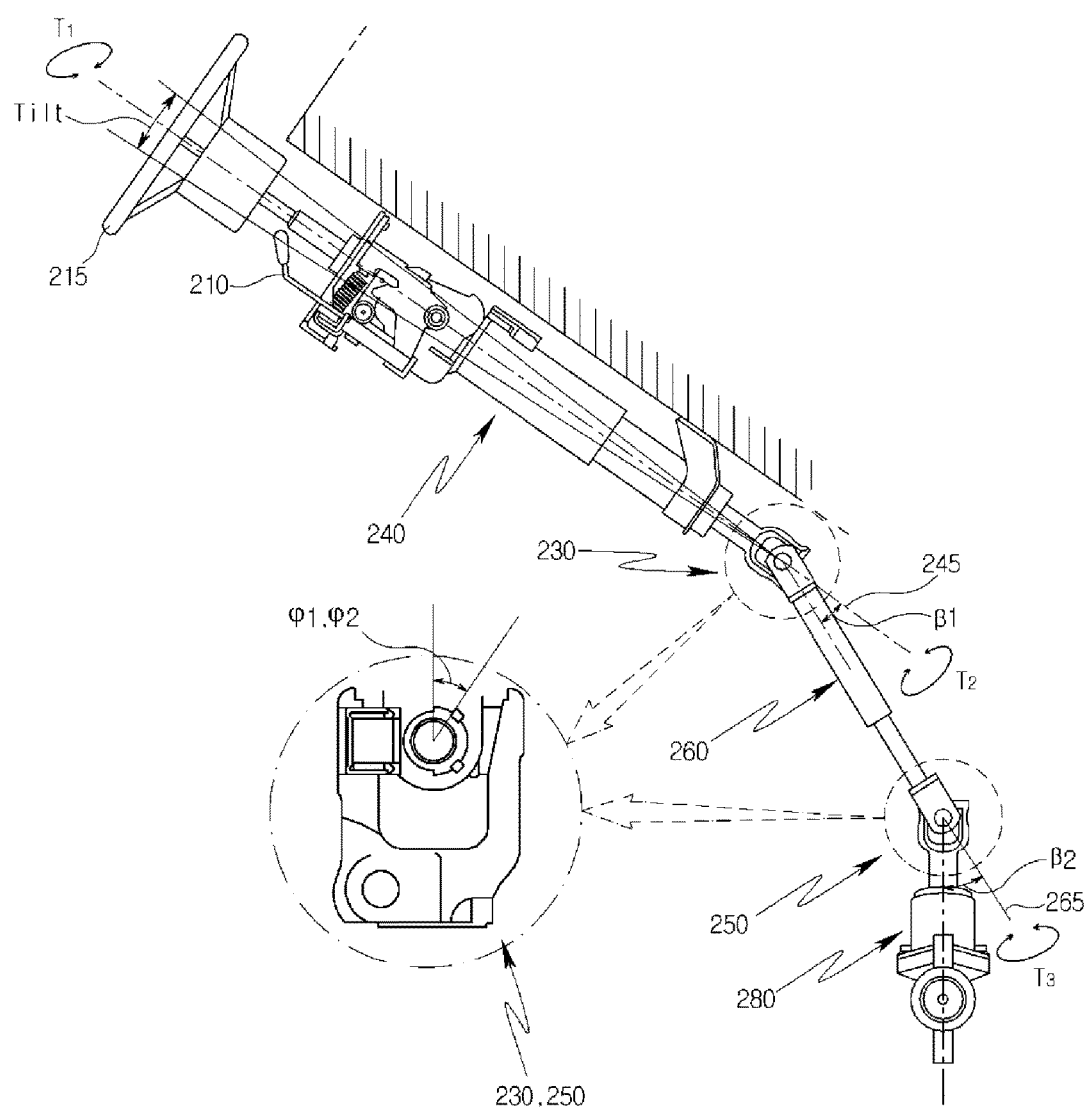

[Fig. 5A]
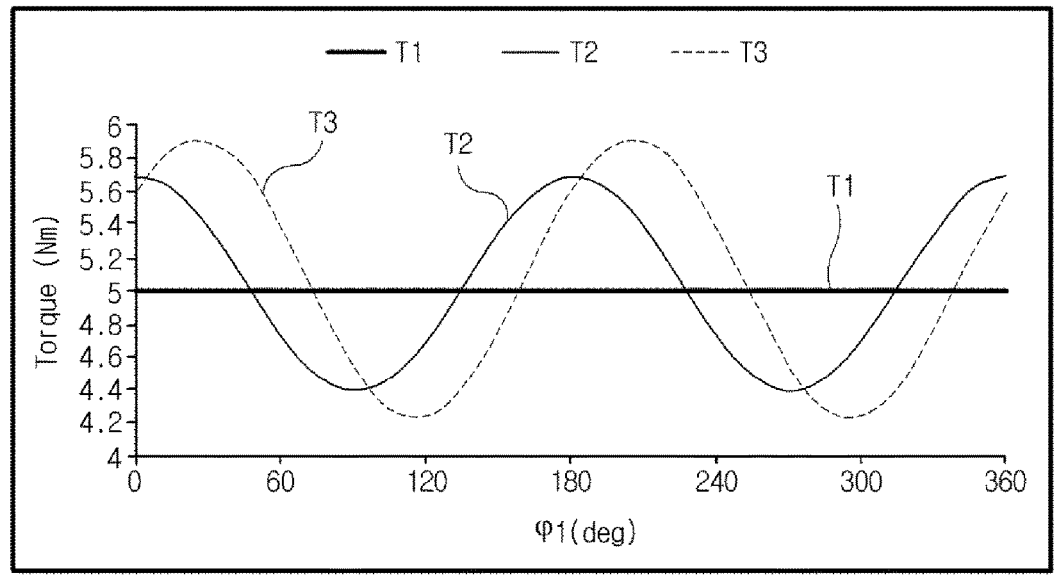
[Fig. 5B]
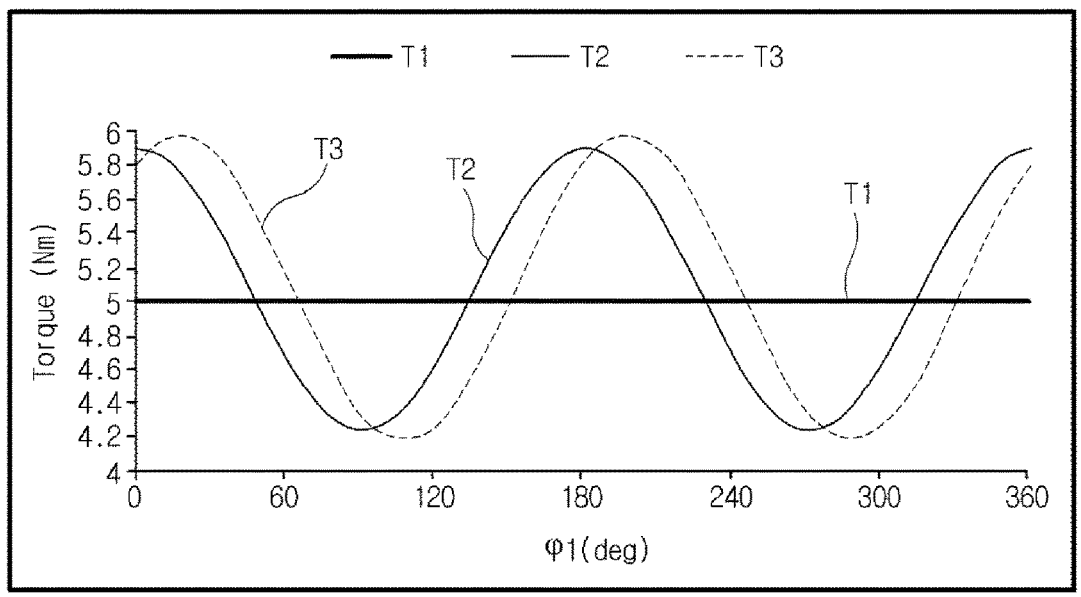

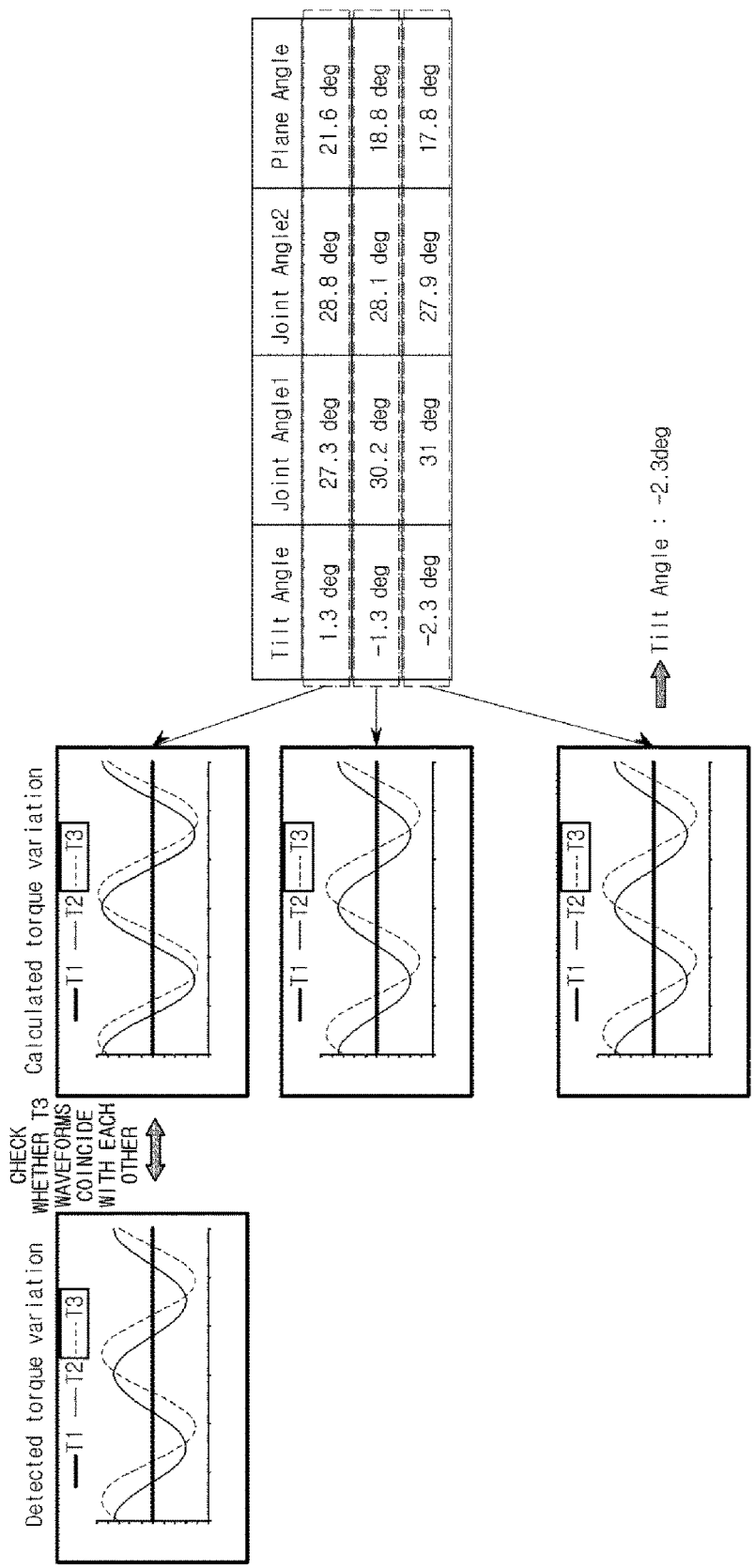

METHOD AND SYSTEM FOR RECOGNIZING A TILT ANGLE THROUGH SENSING OF TORQUE VARIATION IN VEHICLE

CROSS-REFERENCE(S) TO RELATED APPLICATIONS

This application claims priority to Korean Patent Application No(s). 10-2016-0055395, filed on May 4, 2016, the disclosure(s) of which is(are) incorporated herein by reference in its(their) entirety.

BACKGROUND OF THE INVENTION

Field of the Invention

Exemplary embodiments of the present invention relate to recognizing the change of the tilt angle of a steering shaft, and more particularly, to a method and system for recognizing a tilt angle through detection of torque variation in a vehicle, in which the change value of a steering shaft is derived from a variation in torque depending on the change in the steering shaft.

Description of the Related Art

In general, a torque detection device for detecting torque applied to the steering shaft of a vehicle may be used together with, for example, an electric steering system (EPS). The torque detection device is attached to two shaft segments or portions of the steering shaft, which axially face each other and are coupled to each other by a torsion rod. In the torque detection device, the rotational motion of the steering shaft is transmitted to a small gear wheel having magnets by a transmission. Then, the rotation of the small gear wheel is detected using a magnetic sensor.

The conventional EPS used together with the torque detection device adjusts a tilt angle of the steering shaft for the steering convenience of drivers, but it does not have a function for detecting the tilt angle.

SUMMARY OF THE INVENTION

An object of the present invention is to provide a method and system for recognizing a tilt angle through detection of torque variation in a vehicle, capable of detecting a torque variation when a vehicle driver steers a handle and calculating a torque variation waveform by calculating a joint angle according to a tilt angle, in order to recognize the tilt angle coinciding with the detected torque variation waveform.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a system for recognizing a tilt angle through detection of torque variation in a vehicle includes a steering unit including a steering wheel steered by a driver and a steering shaft connected to the steering wheel, a torque detection unit configured to detect a torque variation according to a change in tilt angle of the steering shaft, and a control unit configured to calculate a torque variation using pre-stored data for a joint angle of the steering shaft and a plane angle of the steering shaft according to the change in tilt angle of the steering shaft, and to derive data for a tilt angle of the steering shaft by matching the calculated torque variation with the torque variation detected by the torque detection unit.

The control unit may search the calculated torque variation coinciding with the torque variation detected by the torque detection unit, and derive the tilt angle of the steering shaft using the joint angle and plane angle of the steering shaft matched with the calculated torque variation.

The calculated torque variation may be calculated by the pre-stored joint angle, the pre-stored plane angle, and a phase angle of the steering shaft, and the phase angle of the steering shaft may be measured by a torque sensor.

The steering shaft may include a first steering shaft connected to the steering wheel, a second steering shaft connected to the first steering shaft, and a third steering shaft connected to the second steering shaft, the vertical angle formed by the first steering shaft and the second steering shaft may be a first joint angle, and the vertical angle formed by the second steering shaft and the third steering shaft may be a second joint angle.

The plane angle formed by the first steering shaft and the second steering shaft may be a first phase angle, and the plane angle formed by the second steering shaft and the third steering shaft may be a second phase angle.

The calculated torque variation may be calculated by the pre-stored first and second joint angles, the pre-stored plane angle, and the pre-stored first and second phase angles.

The system may further include a seat adjustment unit configured to move a driver seat in forward and backward directions or adjust an angle of a backrest according to control of the control unit, and the control unit may control the seat adjustment unit according to the derived tilt angle of the steering shaft.

The control unit may estimate a driver's body type or sitting height according to stored driver data and the derived tilt angle of the steering shaft.

The control unit may control the seat adjustment unit considering the driver's body type or sitting height and the tilt angle of the steering shaft in the event of vehicle collision.

The control unit may inform the driver of data for the driver's body type or sitting height according to the derived tilt angle using at least one of sound and display manners.

In accordance with another aspect of the present invention, a method of recognizing a tilt angle through detection of torque variation in a vehicle, the method being performed by a system in which a joint angle and a plane angle according to a tilt angle of a steering shaft are matched and stored in a table, includes changing the tilt angle of the steering shaft, detecting a torque variation according to a change in tilt angle of the steering shaft by a torque detection unit, calculating a torque variation using data for the pre-stored joint angle and plane angle of the steering shaft, based on the table, by a control unit, deriving the calculated torque variation coinciding with the detected torque variation by the control unit, and deriving the tilt angle of the steering shaft matched with the calculated torque variation.

The method may further include controlling a driver seat according to the derived tilt angle by the control unit.

The control unit may search the calculated torque variation coinciding with the torque variation detected by the torque detection unit, and derive the tilt angle of the steering shaft using the joint angle and plane angle of the steering shaft matched with the calculated torque variation.

The control unit may inform a driver of data for a driver's body type or sitting height and an optimal seat position according to the derived tilt angle using at least one of sound and display manners.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a functional block diagram schematically illustrating a system for recognizing a tilt angle through detection of torque variation in a vehicle according to an embodiment of the present invention;

FIG. 2 is a view illustrating a steering unit according to the embodiment of the present invention;

FIG. 3 is a view for explaining a joint angle and a plane angle to a tilt angle according to the embodiment of the present invention;

FIG. 4 is a flowchart illustrating a method of recognizing a tilt angle through detection of torque variation in a vehicle according to another embodiment of the present invention;

FIGS. 5A and 5B are views illustrating a torque variation depending on the change in the tilt angle according to the embodiment of the present invention; and FIG. 6 is a view for explaining a method of deriving a tilt angle of a steering shaft when the detected torque variation coincides with the calculated torque variation according to the embodiment of the present invention.

DESCRIPTION OF SPECIFIC EMBODIMENTS

Exemplary embodiments of the present invention will be described below in more detail with reference to the accompanying drawings so as to be realized by a person of ordinary skill in the art. The present invention may, however, be embodied in different forms and should not be construed as limited to the embodiments set forth herein.

In certain embodiments, the description irrelevant to the present invention may be omitted to avoid obscuring appreciation of the disclosure. Throughout the disclosure, like reference numerals refer to like parts throughout the various figures and embodiments of the present invention.

In the whole description, it will be understood that when an element is referred to as being "connected" to another element, it can be "directly connected" to the other element or it can be "electrically connected" to the other element with other elements being interposed therebetween. In addition, it will be understood that when a component is referred to as being "comprising" any component, it does not exclude other components, but can further comprises the other components unless otherwise specified.

It will be understood that when an element is referred to as being "above" another element, it can be immediately above the other element or intervening elements may also be present. In contrast, when an element is referred to as being "immediately above" another element, there are no intervening elements present.

Although terms such as first, second, and third are used to describe various parts, components, regions, layers, and/or sections, the present invention is not limited thereto. Such terms will be used only to differentiate one part, component, region, layer, or section from other parts, components, regions, layers, or sections. Accordingly, a first part, component, region, layer, or section may be referred to as a second part, component, region, layer, or section without deviating from the scope and spirit of the present invention.

The terminology used in the specification of the present invention is for the purpose of describing particular embodiments only and is not intended to limit the invention. As used in the specification and the appended claims, the singular forms are intended to include the plural forms as well, unless context clearly indicates otherwise. It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, and/or components thereof.

Spatially-relative terms such as "below", "above", or the like may be used herein to describe one element's relationship to another element as illustrated in the Figures. It will be understood that spatially-relative terms are intended to encompass different orientations of the device in addition to the orientation depicted in the Figures. For example, if the device in one of the figures is turned over, elements described as "below" other elements would then be oriented "above" the other elements. The exemplary terms "below" can, therefore, encompass both an orientation of above and below. Since the device may be oriented in another direction such as rotation of 90° or another angle, the spatially-relative terms may be interpreted in accordance with the orientation of the device.

Unless otherwise defined, all terms, including technical and scientific terms, used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, the exemplary embodiments of the present invention will be described in more detail with reference to the accompanying drawings so as to be realized by a person of ordinary skill in the art. The present invention may, however, be embodied in different forms and should not be construed as limited to the embodiments set forth herein.

FIG. 1 is a functional block diagram schematically illustrating a system for recognizing a tilt angle through detection of torque variation in a vehicle according to an embodiment of the present invention.

Referring to FIG. 1, the system for recognizing a tilt angle through detection of torque variation in a vehicle, which is designated by reference numeral 100, according to the embodiment of the present invention may include a steering unit 110, a torque detection unit 120, an angle table 130, a storage unit 140, a control unit 150, and a seat adjustment unit 160.

The steering unit 110 includes a steering wheel that is steered by a driver, and a steering shaft that is connected to the steering wheel. The steering shaft may include a first steering shaft that is connected to the steering wheel, a second steering shaft that is connected to the first steering shaft, and a third steering shaft that is connected to the second steering shaft. The specific configuration of the steering unit will be described later.

The torque detection unit 120 may detect a torque variation according to the change in the position of the steering shaft of the steering unit 110 in the waveform of frequency. The torque variation may mean a variation of the output torque value to the input torque value.

The angle table 130 stores values, which are obtained by matching a joint angle with a plane angle according to the tilt angle of the steering unit 110, in the form of data. The angle table 130 may be a kind of database. The specific description of the tilt angle, joint angle, and plane angle of the steering unit 110 will be given later.

The storage unit 140 may store driver data, such as a driver's body type or sitting height, and data for an optimal seat position that is derived by matching the driver data with the tilt angle of the steering unit 110. Here, although the angle table 130 and the storage unit 140 are described to be separate components, they may be one component in such a manner that the angle table 130 is included in the storage unit 140. For example, the storage unit 140 may be a database that stores various types of data.

The control unit 150 recognizes a change of the joint angle depending on the change in the tilt angle of the steering unit 110, calculates a torque variation to the recognized change of the joint angle, and recognizes a tilt angle at which the calculated torque variation coincides with the detected torque variation. Specifically, the control unit 150 may calculate a torque variation through the joint angle and the plane angle, which are pre-stored in the angle table 130, depending on the change in the tilt angle of the steering unit 110, and compare the calculated torque variation with the torque variation detected by the torque detection unit 120. The control unit 150 may calculate the torque variation coinciding with the torque variation detected by the torque detection unit 120, and recognize the joint angle and plane angle of the steering unit 110, which coincide with the calculated torque variation. Through such a process, the control unit 150 may inversely derive how much the tilt angle of the steering unit 110 has been changed. The specific definition of the joint angle and the plane angle will be described later.

The seat adjustment unit 160 includes a motor, and moves a driver seat in forward and backward directions or adjusts the angle of a backrest by driving the motor according to the control of the control unit 150. Accordingly, the control unit 150 allows the driver seat to be adjusted according to the recognized tilt angle, and the seat adjustment unit 160 moves the driver seat in the forward and backward directions or adjusts the angle of the backrest.

The control unit 150 may estimate a driver's body type or sitting height according to the recognized tilt angle, based on the driver data stored in the storage unit 140.

Meanwhile, the system 100 according to the embodiment of the present invention may further include an output unit that outputs sound, or a display unit that visually displays any situation or operation of the system such that the driver may check the state, in addition to the above components.

FIG. 2 is a view illustrating the steering unit according to the embodiment of the present invention. FIG. 3 is a view for explaining the joint angle and the plane angle to the tilt angle according to the embodiment of the present invention.

Referring to FIGS. 1 to 3, the steering unit 110 may include a tilt angle adjustment part 210, a first joint 230, a first steering shaft 240, a second joint 250, a second steering shaft 260, and a third steering shaft 280. The first steering shaft 240 may be connected to the second steering shaft 260 by the first joint 230, and the second steering shaft 260 may be connected to the third steering shaft 280 by the second joint 250.

The tilt angle adjustment part 210 may be a lever for vertically changing a position of a steering wheel 215 of the vehicle. The position of the steering wheel 215 may be changed by the tilt angle adjustment part 210, and thus a torque value may be changed by the rotation of the first and second joints 230 and 250.

The first steering shaft 240 may be connected to the steering wheel 215, and be connected to the second steering shaft 260 by the first joint 230. The vertical angle formed by a first steering reference 245 indicative of the direction in which the first steering shaft 240 extends, and a second steering reference 265 indicative of the direction in which the second steering shaft 260 extends, may be a first joint angle $\beta 1$. In addition, the plane angle formed by the first steering shaft 240 and the second steering shaft 260 may be a first phase angle $\varphi 1$. That is, the first steering shaft 240 and the first steering reference 245 are changed depending on the change in the position of the steering wheel 215, and thus the first joint angle $\beta 1$ and the first phase angle $\varphi 1$ are changed.

The second steering shaft 260 may be connected to the third steering shaft 280 by the second joint 250. The vertical angle formed by the direction, in which the third steering shaft 280 extends, and the second steering reference 265 may be a second joint angle $\beta 2$. In addition, the plane angle formed by the second steering shaft 260 and the third steering shaft 280 may be a second phase angle $\varphi 2$. The first joint angle $\beta 1$ is changed depending on the change in the position of the steering wheel 215, and thus the second steering shaft 260, the second joint angle $\beta 2$, and the second phase angle $\varphi 2$ are changed.

When the tilt angle of the first steering shaft 240 is changed depending on the change in the position of the steering wheel 215, a first output torque T2 and a second output torque T3 may be varied depending on the input torque T1 when the steering wheel 215 is steered. That is, the values of the output torques T2 and T3 depending on the change in the tilt angle of the first steering shaft 240 may be changed even when the same input torque T1 is input. The first output torque T2 may be a torque value by the rotation of the first joint 230, and the second output torque T3 may be a torque value by the second joint 250. The input torque T1 and the first and second output torques T2 and T3 may be measured by a torque sensor (not shown). The torque sensor may be one component of the steering unit 110, and may consist of a plurality of torque sensors provided in the steering unit 110. In addition, the torque sensor may measure the first and second phase angles $\varphi 1$ and $\varphi 2$. That is, the input torque T1, the first and second output torques T2 and T3, and the first and second phase angles $\varphi 1$ and $\varphi 2$ may be measured by the torque sensor. The angle table 130 stores only data for the tilt angle of the first steering shaft 240 and the first and joint angles $\beta 1$ and $\beta 2$.

The following Table 1 illustrates an example of data for the tilt angle of the first steering shaft 240 and the first and joint angles $\beta 1$ and $\beta 2$, which are stored in the angle table 130.

TABLE 1

| Tilt Angle | Joint Angle | Joint Angle2 | Plane Angle |
| --- | --- | --- | --- |
| 2.6 deg | 25.8 deg | 29.2 deg | 23.9 deg |
| 1.3 deg | 27.3 deg | 28.8 deg | 21.6 deg |
| 0 deg | 28.5 deg | 28.5 deg | 20 deg |

TABLE 1-continued

| Tilt Angle | Joint Angle | Joint Angle2 | Plane Angle |
| --- | --- | --- | --- |
| −1.3 deg | 30.2 deg | 28.1 deg | 18.8 deg |
| −2.6 deg | 31.4 deg | 27.8 deg | 16.8 deg |

Here, as illustrated in FIG. 3, the plane angle is an angle formed by the plane, which is formed by ① line and ② line, and the plane which is formed by ② line and ③ line. In this case, the ① line may be the first steering reference 245, the ② line may the second steering reference 265, and the ③ line may a steering reference indicative of the direction in which the third steering shaft 280 extends.

FIG. 4 is a flowchart illustrating a method of recognizing a tilt angle through detection of torque variation in a vehicle according to another embodiment of the present invention.

Referring to FIG. 4, the tilt angle of a first steering shaft may be changed by the operation of the driver. The driver may change the tilt angle of the first steering shaft considering his/her body type, his/her sitting height, etc. In this case, first and second joint angles are changed depending on the change in the tilt angle of the first steering shaft, with the consequence that first and second output torques are varied (S210).

Next, a torque detection unit may detect a torque variation according to the change in the tilt angle of the first steering shaft. Specifically, the torque detection unit may detect a value of the second torque according to the input torque. In this case, the torque detection unit detects a torque variation according to the steering in the waveform of frequency as illustrated in FIGS. 5A and 5B. FIGS. 5A and 5B are views illustrating a torque variation depending on the change in the tilt angle according to the embodiment of the present invention. Referring to FIGS. 5A and 5B, it can be seen that the frequency waveforms of the output torques T2 and T3 according to the change in the tilt angle of the first steering shaft are changed even when the same input torque T1 is input (S220).

Next, a control unit may calculate a plurality of torque variations using the data of the first steering shaft, which is pre-stored in the angle table. The pre-stored data of the first steering shaft may include data for the tilt angle of the first steering shaft and first and joint angles. First and second phase angles may be measured by a torque sensor (S230).

The control unit 150 calculates the torque variation using the following Equation 1.

$$T_1\omega_1 = T_2\omega_2 = T_3\omega_3 = T_4\omega_4 = \text{Constant} \quad [\text{Equation 1}]$$

$$\tan\varphi_2 = \cos\beta_1 \tan\varphi_1$$

$$\frac{\omega_2}{\omega_1} = \frac{\cos\beta_1}{1 - \sin^2\beta_1 \sin^2\varphi_1} = \frac{T_1}{T_2} \rightarrow T_2 = \frac{1 - \sin^2\beta_1 \sin^2\varphi_1}{\cos\beta_1} T_1$$

$$\varphi_2 = \arctan(\cos\beta_1 \tan\varphi_1)$$

$$\varphi_2' = \varphi_2 - \alpha_1 + \lambda_1 - \frac{\pi}{2}$$

$$T_3 = \frac{1 - \sin^2\beta_2 \sin^2\varphi_2'}{\cos\beta_2} T_2$$

$$= \left(\frac{1 - \sin^2\beta_2 \sin^2\left((\arctan(\cos\beta_1 \tan\varphi_1)) - \alpha_1 + \lambda_1 - \frac{\pi}{2}\right)}{\cos\beta_2}\right)$$

$$\left(\frac{1 - \sin^2\beta_1 \sin^2\varphi_1'}{\cos\beta_1}\right) T_1$$

In Equation 1, T1 (Nm) refers to an input torque, T2 refers to a first output torque, and T3 refers to a second output torque.

In Equation 1, φ1 (deg) refers to a phase angle of a first joint, and φ2 (deg) refers to a phase angle of a second joint.

In Equation 1, β1 (deg) refers to a first joint angle, β2 (deg) refers to a second joint angle, α1 refers to a plane angle, and λ1 refers an optimal phase angle. Since λ1 is a predefined constant value, there is no need to separately measure the value.

Next, the control unit may compare the calculated torque variation with the torque variation detected by the torque detection unit to calculate a torque variation when they coincide with each other. That is, the control unit may calculate a torque variation that coincides with the torque variation detected by the torque detection unit, as illustrated in FIGS. 5A and 5B, and may search data for the steering shaft, which is matched with the calculated torque variation, from the angle table illustrated in Table 1. As illustrated in FIG. 6, the tilt angle of the first steering shaft is recognized by searching β1 (deg) and β2 (deg) at which the torque variation calculated in the angle table coincides with the detected torque variation. FIG. 6 is a view for explaining a method of deriving the tilt angle of the steering shaft when the detected torque variation coincides with the calculated torque variation according to the embodiment of the present invention. In FIG. 6, the control unit may calculate a torque variation by Equation 1 using the input torque T1, the second output torque T3, and the first phase angle φ1 which are detected by the torque detection unit. Accordingly, the control unit may compare the waveform of the second output torque T3 according to the variation in the torque detected by the torque detection unit with the waveform of the second output torque T3 according to the calculated torque variation. In this case, the control unit calculates a plurality of torque variations based on the angle table, and compares the plurality of torque variations with the detected torque variation. The control unit may calculate a second output torque T3 according to the calculated torque variation, which coincides with the frequency waveform of the second output torque T3 according to the detected torque variation, and may match the torque variation with the angle table. Through such a process, the control unit may recognize that the tilt angle of the first steering shaft is changed by −2.3 degrees (S240).

Next, the control unit may allow a driver seat to be adjusted according to the recognized tilt angle. A seat adjustment unit moves the driver seat in the forward and backward directions or adjusts the angle of a backrest according to the control of the control unit. In addition, the control unit searches driver data for a driver's body type or sitting height corresponding to the recognized tilt angle, in a storage unit. The control unit outputs the driver's body type or sitting height according to the recognized tilt angle, based on the driver data searched in the storage unit, such that the driver checks the same (S250).

That is, the control unit outputs the driver data related to the driver's body type or sitting height according to the recognized tilt angle in the form of sound, or displays the driver data on the screen, such that the driver checks the driver data.

In the above operation processes, the control unit may perform the operation for adjusting the driver seat or outputting the driver data in reverse order or at the same time, after recognizing the tilt angle.

Accordingly, the system according to the present invention can recognize the tilt angle of the first steering shaft using the torque variation depending on the change of the first steering shaft, estimate the driver's body type or sitting height or the like using the recognized tilt angle, and perform convenience and safety functions for the driver by adjusting the driver seat according to the tilt angle for driver safety in the event of vehicle collision.

As is apparent from the above description, the present invention can detect a torque variation when a vehicle is steered according to the tilt angle of a handle and can calculate the torque variation by calculating a joint angle according to the tilt angle, in order to recognize the tilt angle at which the calculated torque variation coincides with the detected torque variation.

Accordingly, it is possible to estimate a driver's body type or sitting height or the like according to the recognized tilt angle or to perform convenience and safety functions for drivers by adjusting a driver seat according to the tilt angle.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A system for recognizing a tilt angle through detection of torque variation in a vehicle, comprising:
    a steering unit comprising a steering wheel steered by a driver and a steering shaft connected to the steering wheel;
    a torque detection unit configured to detect a torque variation according to a change in the tilt angle of the steering shaft; and
    a control unit configured to calculate a torque variation using pre-stored data for a joint angle of the steering shaft and a plane angle of the steering shaft according to the change in the tilt angle of the steering shaft, and to derive data for the tilt angle of the steering shaft by matching the calculated torque variation with the torque variation detected by the torque detection unit.

2. The system according to claim 1, wherein the control unit searches the calculated torque variation coinciding with the torque variation detected by the torque detection unit, and derives the tilt angle of the steering shaft using the joint angle and plane angle of the steering shaft matched with the calculated torque variation.

3. The system according to claim 1, wherein:
    the calculated torque variation is calculated by the pre-stored joint angle, the pre-stored plane angle, and a phase angle of the steering shaft; and
    the phase angle of the steering shaft is measured by a torque sensor.

4. The system according to claim 1, wherein:
    the steering shaft comprises a first steering shaft connected to the steering wheel, a second steering shaft connected to the first steering shaft, and a third steering shaft connected to the second steering shaft;
    a vertical angle formed by the first steering shaft and the second steering shaft is a first joint angle; and
    a vertical angle formed by the second steering shaft and the third steering shaft is a second joint angle.

5. The system according to claim 4, wherein:
    a plane angle formed by the first steering shaft and the second steering shaft is a first phase angle; and
    a plane angle formed by the second steering shaft and the third steering shaft is a second phase angle.

6. The system according to claim 5, wherein the calculated torque variation is calculated by the pre-stored first and second joint angles, the pre-stored plane angle, and the pre-stored first and second phase angles.

7. The system according to claim 1, further comprising a seat adjustment unit configured to move a driver seat in forward and backward directions or adjust an angle of a backrest according to control of the control unit,
    wherein the control unit controls the seat adjustment unit according to the derived tilt angle of the steering shaft.

8. The system according to claim 7, wherein the control unit estimates a driver's body type or sitting height according to stored driver data and the derived tilt angle of the steering shaft.

9. The system according to claim 8, wherein the control unit controls the seat adjustment unit considering the driver's body type or sitting height and the tilt angle of the steering shaft in the event of vehicle collision.

10. The system according to claim 8, wherein the control unit informs the driver of data for the driver's body type or sitting height according to the derived tilt angle using at least one of sound and display manners.

11. A method of recognizing a tilt angle through detection of torque variation in a vehicle, the method being performed by a system in which a joint angle and a plane angle according to a tilt angle of a steering shaft are matched and stored in a table, the method comprising:
    (a) changing the tilt angle of the steering shaft;
    (b) detecting a torque variation according to a change in the tilt angle of the steering shaft by a torque detection unit;
    (c) calculating a torque variation using data for the pre-stored joint angle and a plane angle of the steering shaft, based on the table, by a control unit;
    (d) deriving the calculated torque variation coinciding with the torque variation detected by the control unit; and
    (e) deriving the tilt angle of the steering shaft matched with the calculated torque variation.

12. The method according to claim 11, further comprising (f) controlling a driver seat according to the derived tilt angle by the control unit.

13. The method according to claim 11, wherein the control unit searches the calculated torque variation coinciding with the torque variation detected by the torque detection unit, and derives the tilt angle of the steering shaft using the joint angle and plane angle of the steering shaft matched with the calculated torque variation.

14. The method according to claim 11, wherein the control unit informs a driver of data for a driver's body type or sitting height and an optimal seat position according to the derived tilt angle using at least one of sound and display manners.

* * * * *